United States Patent
Dross

(10) Patent No.: US 10,295,153 B2
(45) Date of Patent: May 21, 2019

(54) OPTICAL SYSTEM FOR PRODUCING UNIFORM ILLUMINATION

(71) Applicant: SIGNIFY HOLDING B.V., Eindhoven (NL)

(72) Inventor: Oliver Dross, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 21 days.

(21) Appl. No.: 14/912,744

(22) PCT Filed: Aug. 22, 2014

(86) PCT No.: PCT/EP2014/067882
§ 371 (c)(1),
(2) Date: Feb. 18, 2016

(87) PCT Pub. No.: WO2015/025028
PCT Pub. Date: Feb. 26, 2015

(65) Prior Publication Data
US 2016/0195243 A1    Jul. 7, 2016

(30) Foreign Application Priority Data
Aug. 22, 2013  (EP) .................................... 13181278

(51) Int. Cl.
*F21V 5/00*    (2018.01)
*F21V 5/04*    (2006.01)
(Continued)

(52) U.S. Cl.
CPC ............. *F21V 13/04* (2013.01); *F21V 5/045* (2013.01); *F21V 7/0066* (2013.01);
(Continued)

(58) Field of Classification Search
CPC ........ F21V 7/0066; F21V 7/048; F21V 5/004; F21V 5/048; F21V 7/09; F21V 7/0091; F21V 5/045; G02B 19/0028
See application file for complete search history.

(56) References Cited

U.S. PATENT DOCUMENTS 7,651,246 B2 *  1/2010  Bollea .................. F21S 48/215
                                                      362/329
8,231,250 B2    7/2012  Bailey
(Continued)

FOREIGN PATENT DOCUMENTS

CN       202791801       3/2013
DE    102008036845 A1 *  2/2010  ................ F21V 5/04
(Continued)

OTHER PUBLICATIONS

Machine translation of DE 102008036845 retrieved from Espacenet.*
(Continued)

*Primary Examiner* — Alexander K Garlen
*Assistant Examiner* — Colin J Cattanach
(74) *Attorney, Agent, or Firm* — Akarsh P. Belagodu

(57) ABSTRACT

An optical system for producing uniform illumination on a target, comprising a lens body (204), a recess (202) formed on a bottom side of the lens body (204) at a central region thereof accommodating a light source arranged in an integration zone (206), the recess (202) having a side entry surface (208) and a central entry surface (210), a total internal reflection surface (212) provided at a side surface of the lens body (204), wherein the total internal reflection surface (212) comprises a plurality of first lenslets (216); and an exit surface (214) provided at a top side of the lens body (204), the exit surface (314) comprising a plurality of second lenslets (218), wherein each of the first lenslets (216) forms a pair (220) with each of the second lenslets (218), wherein the first lenslet (216) of the pair (220) focuses light
(Continued)

from the integration zone (206) upon the second lenslet (218) of the pair (220), and wherein the second lenslet (218) of the pair (220) focuses the target upon the first lenslet (216) of the pair (220), such that the lens (200) produces uniform illumination on the target.

13 Claims, 5 Drawing Sheets

(51) Int. Cl.
| | | |
|---|---|---|
| F21V 7/00 | (2006.01) | |
| F21V 7/04 | (2006.01) | |
| F21V 13/04 | (2006.01) | |
| G02B 19/00 | (2006.01) | |
| G02B 27/09 | (2006.01) | |
| F21Y 105/10 | (2016.01) | |
| F21Y 115/10 | (2016.01) | |

(52) U.S. Cl.
CPC ............ *F21V 7/0091* (2013.01); *F21V 7/048* (2013.01); *G02B 19/0028* (2013.01); *G02B 19/0061* (2013.01); *G02B 27/0905* (2013.01); *F21V 5/004* (2013.01); *F21V 5/04* (2013.01); *F21Y 2105/10* (2016.08); *F21Y 2115/10* (2016.08)

(56) References Cited

U.S. PATENT DOCUMENTS

| | | | | |
|---|---|---|---|---|
| 8,419,232 | B2 | 4/2013 | Minano et al. | |
| 8,591,074 | B1* | 11/2013 | Jiang | F21V 7/0091 362/311.02 |
| 9,347,642 | B2* | 5/2016 | Catalano | F21V 5/04 |
| 9,732,938 | B2* | 8/2017 | Morgan | F21V 7/04 |
| 9,739,446 | B2* | 8/2017 | Johnson | G02B 3/08 |
| 2003/0016539 | A1* | 1/2003 | Minano | F21V 7/04 362/347 |
| 2005/0152153 | A1* | 7/2005 | Amano | F21S 48/215 362/520 |
| 2006/0158899 | A1* | 7/2006 | Ayabe | F21V 7/0091 362/602 |
| 2007/0251568 | A1* | 11/2007 | Maeda | G02B 19/0042 136/246 |
| 2007/0268694 | A1* | 11/2007 | Bailey | G02B 27/0955 362/231 |
| 2008/0047605 | A1* | 2/2008 | Benitez | F24J 2/06 136/259 |
| 2009/0071467 | A1* | 3/2009 | Benitez | F24J 2/085 126/685 |
| 2009/0109687 | A1* | 4/2009 | Householder | F21L 4/027 362/309 |
| 2009/0219716 | A1* | 9/2009 | Weaver | F21V 3/04 362/235 |
| 2009/0231739 | A1* | 9/2009 | Winston | G02B 17/0856 359/853 |
| 2011/0317414 | A1* | 12/2011 | Marfeld | F21V 5/04 362/235 |
| 2013/0058103 | A1* | 3/2013 | Jiang | F21V 5/04 362/296.05 |
| 2013/0314925 | A1* | 11/2013 | Jiang | F21V 5/04 362/311.02 |
| 2014/0313758 | A1* | 10/2014 | Nakaya | F21S 48/1154 362/516 |
| 2015/0077987 | A1* | 3/2015 | Zhang | G02B 19/0028 362/235 |

FOREIGN PATENT DOCUMENTS

| | | | | |
|---|---|---|---|---|
| EP | 1589282 | A1* | 10/2005 | .......... F21S 48/1154 |
| FR | 2867257 | A1* | 9/2005 | ............ F21S 48/215 |
| JP | 2013115079 | A | 6/2013 | |
| JP | 5228217 | B1 | 7/2013 | |
| WO | WO 2007016363 | A2* | 2/2007 | .......... G02B 3/0068 |
| WO | WO2013104878 | | 7/2013 | |

OTHER PUBLICATIONS

Machine translation of FR 2867257 retrieved from Espacenet.*
O. Dross et al., "Kohler Integrators Embedded Into Illumination Optics Add Functionality", Proceedings of SPIE, vol. 7103, Jan. 1, 2008, p. 71030G.
Shen Mo, et al., "P-154: Reflective Fly Eye Condenser Design for LED Illuminating Projection System", 2005 SID International Symposium, Boston, MA, May 24-27, 2005, San Jose, CA, SID, US, vol. XXXVI, May 24, 2005, pp. 888-891.

\* cited by examiner

OPTICAL SYSTEM FOR PRODUCING UNIFORM ILLUMINATION

CROSS-REFERENCE TO PRIOR APPLICATIONS

This application is the U.S. National Phase application under 35 U.S.C. § 371 of International Application No. PCT/EP2014/067882, filed on 22 Aug. 2014, which claims the benefit of EP Patent Application No. 13181278.6, filed on 22 Aug. 2013. These applications are hereby incorporated by reference herein.

FIELD OF THE INVENTION

The present invention relates to optical systems and in particular to an optical lens for producing uniform illumination on a target.

BACKGROUND OF THE INVENTION

The ability to control focusing and distribution of light is critical in order to provide efficient illumination. Many optical systems employ one or more optical elements to achieve a desired light distribution and/or desired illumination uniformity. Depending on situation and requirements various light sources are employed, including incandescence, fluorescence and solid state based light sources. The design of the optical system typically varies depending on the light source used. It is however problematic to compensate for spatial and/or intensity variations in intensity and/or colour of the light sources used, which is critical when producing uniform illumination. Typical problems encountered for instance when using an optical system in the form of a standard total internal reflection (TIR) collimator are 1) Colour over angle variation of a light source, leading to colour at different off axis angles in the far field, 2) Colour over position variations of a light source, which also leads to colour artifacts, and 3) Strong non-uniformities in the intensity of the collimator when using an arrays of light sources having dark regions (i.e. regions not producing light) between them.

One way to counteract these problems is to utilize techniques to disperse and redistribute or mix light using diffusion elements or facets on the exit surface on a total internal reflection (TIR) collimator. U.S. 2013/0058103 for example discloses a collimator (or lens as it is called in U.S. 2013/0058103) comprising: a lens body; a total reflection surface provided on an outer side of the lens body, the reflection surface being in the form of a scale like polyhedron; a recess formed on a bottom side of the lens body at a central region thereof for accommodating a LED, the recess having a side surface and a central surface; a micro lens array formed at the central surface of the recess; and a light-emitting surface provided at a top side of the lens body; wherein a substantially uniform circular light spot is formed by the lens.

However, it is challenging to alleviate all the problems mentioned above utilizing the collimator of U.S. 2013/0058103, especially if the light source varies strongly in luminance over position. The faceting and diffusion elements have accordingly to be pronounced in order to mix the light such that the effects pertaining to the in-homogeneity of the light source are smeared out. As a result a uniform illumination may be provided, but at the same time the beam angle of the light leaving the optical system is increased which hinders collimation of the light and reduces control of the light distribution.

Hence there is a need for finding optical systems providing better illumination uniformity and light distribution control.

SUMMARY OF THE INVENTION

An object of the present invention is to solve or at least to reduce the problems discussed above.

In particular according to a first aspect of the invention an optical system for producing uniform illumination on a target is provided, said optical comprising a body, a recess formed on a bottom side of the body at a central region thereof accommodating a light source arranged in an integration zone, the recess having a side entry surface and a central entry surface, a total internal reflection surface provided at a side surface of the body, wherein the total internal reflection surface comprises a plurality of first lenslets, and an exit surface provided at a top side of the body, the exit surface comprising a plurality of second lenslets, wherein each of the first lenslets forms a pair with each of the second lenslets, wherein the first lenslet of the pair focuses light from the integration zone upon the second lenslet of the pair, and wherein the second lenslet of the pair focuses the target upon the first lenslet of the pair, such that the optical system produces uniform illumination on the target.

The wording integration zone should be construed as a region or volume, arranged in relation to an optical element, such that light from substantially each point inside the integration zone illuminates the entire target. It should be noted that if the integration zone is larger than the source, the source may be moved within the integration zone without substantially affecting system performance, which will help relax the placing tolerances of the optical components.

A lenslet should in the present application be understood as a small optical lens of diameter of typically $1/100^{th}$ to $1/5^{th}$ of the diameter of the body of the optical system and may be part of a lens array. Each lenslet may have the same or different focal length. The lenslets may further be arranged on a flat, curved or freeform surface, as will be discussed below.

The invention is based on the insight that irradiance variations within the integration zone may have only a limited affect on the uniformity of the illumination on a target if each point of a light source or an image of a light source in an integration zone of an optical system illuminates the entire target. This cannot, however, be achieved using a single element, such a single element, e.g. being a lens or a mirror, to collect the light produced by the light source as spectral or intensity variations may be seen in the illumination. According to the subject matter of the present invention arrays of lenslets are provided instead of using a single pair of lenses focusing on each other. The usage of the plurality of first lenslets on the total internal reflection surface and the plurality of second lenslets at the exit surface achieve the desired effect. An advantage of the invention is thus that uniform light may be provided even if the light source within the integration zone is non-uniform. The light sources used for producing uniform illumination may therefore, for instance, consist of one or several light sources having different colours, or arrays of light sources having regions that produce less or no light emission, as long as the light is emitted within the integration zone.

The conventional light sources substantially emit light in all directions which lead to inherent losses and reduced illumination performance. Most solid state light sources, such as light emitting diodes (LEDs), are essentially Lambertian light sources that emit light into one hemisphere only. In most cases the LED beam angle is too wide to be used for illumination purposes without introducing some secondary optical element such that the emission angle can be brought to an acceptable value.

According to the present invention an optical system is therefore provided, for which a total internal reflection surface is arranged at a side surface of the body such that the efficiency of the illumination may be improved.

The wording total internal reflection surface should be construed as a surface at which total internal reflection (TIR) may occur. TIR is an optical effect that occurs when a ray of light reaches a boundary between a first and a second medium at an angle larger than a critical angle, with respect to the normal of the boundary surface. For TIR to occur it is needed that the refractive index of the first medium is larger than the refractive index of the second material, i.e. in order for the light ray to be totally reflected at the boundary such that no light propagate beyond the boundary and all light is substantially reflected at the boundary.

Adding lenslets onto already designed surfaces of optical systems may further improve the optical system performance, while preserving its original function. Another advantage being that no additional optical elements are being added. Hence the light output from the lens may be made more efficient in terms of intensity and beam collimation and further less dependent on the characteristics of the light source.

An optical system utilizing TIR may hence be seen as a collimator formed such that the optical system collimates light from the integration zone and sends a beam of light out from the optical system. A typical TIR based optical system has substantially the form of a cone with a cavity or recess in which a light source can be placed, as will be described below.

By further forming the pairs of lenslets such that each of the first lenslets forms a pair with each of the second lenslets, the lenslets may be arranged such that the first lenslet of the pair focuses light from the integration zone upon the second lenslet of the pair, and wherein the second lenslet of the pair focuses the target upon the first lenslet of the pair. In other words, the lenslets within each pair of lenslets are formed such that each first lenslet images the light source on the second lenslet, while the second lenslet images the first lenslet onto the target. Since the source image, i.e. the light source is not projected onto the target, illumination inhomogeneity's and misplacement of the light source within the integration zone will not affect the target illumination. Hence this arrangement may provide improved illumination uniformity and as no shield or diffuser is used, as commonly utilized in prior art solutions, high illumination efficiency and compactness may be obtained at the same time.

According to an embodiment of the present invention the total internal reflection surface consists of an aspheric rotational surface. This is advantageous as it provides rotational symmetry within the optical system, which leads to a mostly rotationally symmetric illumination.

The exit surface may be chosen from a group of geometries comprising flat, tilted and aspheric rotational surfaces, which allows for design of the geometry of the target illuminating area where the optical design can be adjusted to improve the compactness or to influence the basic collimation characteristics.

The optical system may further comprise a centre lens comprising a centre lens entry surface arranged at the central entry surface of the recess, wherein the centre lens entry surface comprises a plurality of third lenslets, and a centre lens exit surface arranged centrally on the exit surface of the lens, wherein the centre lens exit surface comprises a plurality of fourth lenslets, wherein each of the third lenslets forms a pair with each of the fourth lenslets, wherein the third lenslet of the pair focuses light from the integration zone upon the fourth lenslet of the pair, and wherein the fourth lenslet of the pair focuses the target upon the third lenslet of the pair, such that the lens produces uniform illumination on the target. Light entering a central region of the optical system may thereby efficiently be utilized for providing increased uniformity of the illumination on the target.

According to an embodiment of the present invention each of the plurality of third lenslets is an off axis section of a surface of rotationally symmetric shape with an aspheric profile. An advantage of superimposing the lenslets on a non-linear surface is that the original TIR collimator dimensions can be preserved.

According to another embodiment each of the second and the fourth lenslets have, when projecting light into infinity, rotational symmetry around an axis through the center of the corresponding first or third lenslet, with an elliptical profile to focus a point within an optical medium to become a parallel beam.

The third lenslet has, when projecting light from the source onto the fourth lenslet, rotational symmetry around an axis through the center of the corresponding fourth lenslet, with an aspheric Cartesian oval profile to focus a point within source onto the center of the fourth lenslet.

All profiles can be in many practical cases approximated by spherical profiles.

Hence, as a special case the second and the fourth lenslet have rotational symmetry with a spherical profile.

It is thereby possible to obtain an improved uniform illumination and control of the collimation of the light exiting the optical system.

Each first lenslet may have a freeform shape that is a generalized Cartesian oval arranged to couple a wavefront originating from the center of the integration zone and refracted at the side entry surface with a spherical wavefront originating from a centre of the corresponding second lenslet.

The wording freeform shape should be construed as any shape that has no axis of linear or rotational symmetry or a symmetric surface that is rotated about any axis that is not its axis of symmetry. These surfaces provide additional degrees of freedom when designing optical elements.

The freeform shape may be approximated by a spherical, an ellipsoidal surface or a toroid surface described by two crossed spherical sections. This may be advantageous in some embodiments as it simplifies design and fabrication of the optical system.

The term Cartesian oval should be understood as the optical surface making the optical path length between two prescribed wave fronts constant. In this context a Cartesian oval problem is that of finding an optical surface (refractive or reflective) that couples two spherical wavefronts. The problem is named a generalized Cartesian oval problem if it is not required that the wavefronts are spherical. The problem of determining a generalized Cartesian can be solved by requiring the constant path length between the incident and the emergent wavefront.

According to an embodiment the integration zone may be arranged in the recess of the optical system. This is advantageous as it facilitates easy assembly of an optical system and a light source as the optical system can easily be positioned over the light source.

The integration zone may be flat, disk shaped or a spheroid, the shape depending on the geometry of the dimensions and placement tolerances of the light source.

According to another embodiment of the present invention a luminaire is provided, wherein the luminaire comprises the optical system and a light source. This allows for easy implementation of the luminaire for illumination applications.

The light source may be a solid state light source as this, as discussed above, may provide a more efficient light source. It is further advantageous to use solid state light sources as they may have smaller dimensions than conventional light sources.

The solid state light source may be a single-chip or multi-chip package, with one or more colours of red, green, blue, white or any other colour, or an array of individually packed LEDs. These light sources are known to be highly efficient and that the different colours can be used to provide for example white light. By combining these light sources with an optical system according to the present invention it is possible to provide uniform illumination although there may be spatial variations in the irradiance of these light sources. Hence a greater freedom when designing efficient and uniform illumination on a target is provided.

BRIEF DESCRIPTION OF THE DRAWINGS

This and other aspects of the present invention will now be described in more detail, with reference to the appended drawings showing embodiments of the invention. As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
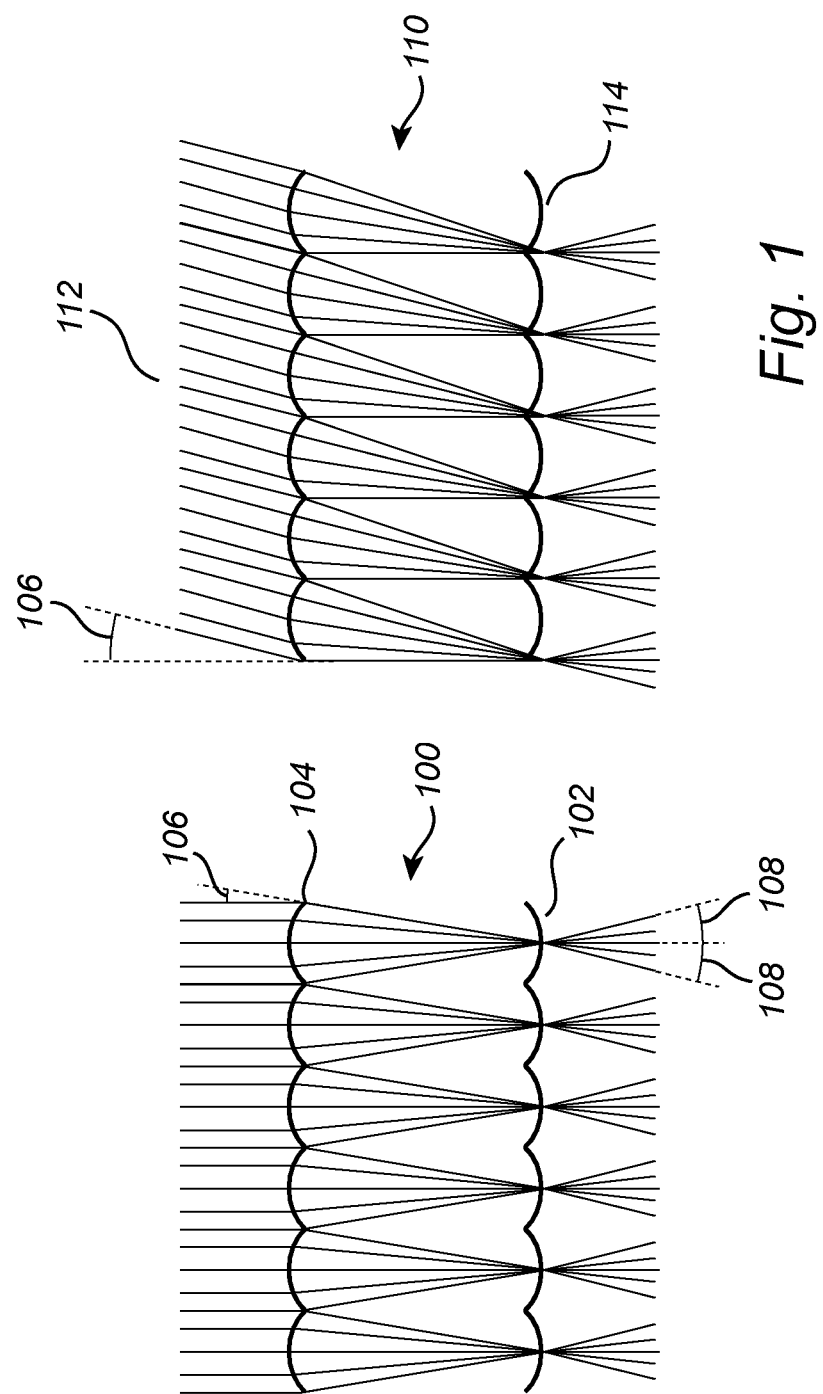
FIG. 1 illustrates the operation of a Koehler integration lenslet array.

For an introductory explanation, FIG. 1 shows the cross-section of an elemental integrator 100 comprising a front lenslet array 102 and an identical but oppositely oriented rear array 104, separated by a distance equal to their focal length. Assuming that the aberrations are weak, all rays impinging on the array 104 with half angle 106 from the vertical direction are ideally coupled with all the rays exiting the array 102 within a half angle 108, which equals angle 106. This angle 106 (and 108) is given by the half-angle size of a far light source (not shown).

FIG. 1 also shows as 110 the same integrator 100 but with a tilted impinging parallel ray fan. The modification of the incident angle of the parallel ray fan 112 from normal incidence up to angle 106 does not affect the far field of the exit rays. Only the emission points 114 are shifted.

Thus an optical integrator has the property of producing an intensity pattern that can be quite insensitive to lateral source-position errors of a point source (e. g., a distant one that produces the parallel rays in FIG. 1) or more generally to extended sources within the angular acceptance (in FIG. 1, any ray bundle with non-zero angular extent inside the maximum acceptance angle 106). For an extended source containing the rays comprised between the positive and negative angle 106, the integrator 100 neither collimates nor diffuses light, since the beam at the output has the same angular extension. Typically such an integrator is used with separate collimating or concentrating optics.

Figure 2:
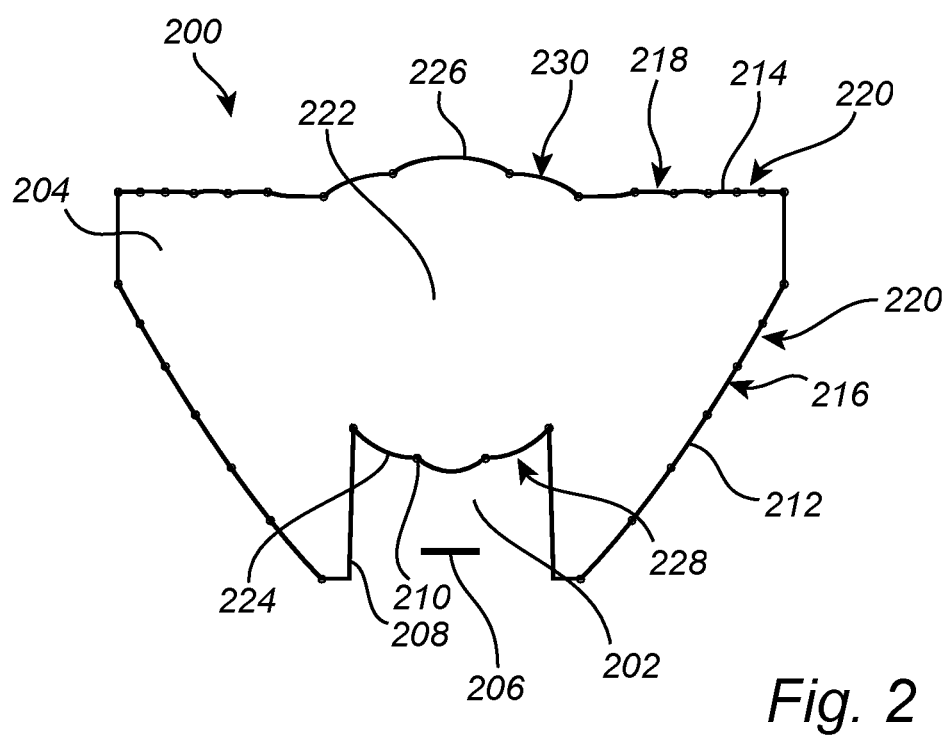
FIG. 2 is a schematic of an optical system according to an embodiment of the present invention.

In the following we will discuss an optical system in the form of a total internal reflection (TIR) collimator having superimposed lenslets according to the subject matter of the present invention. FIG. 2 illustrates an embodiment of the present invention providing improved uniformity and colour mixing of the illumination on a target even if the light source used for light generation shows spatial intensity and spectral variations. The TIR collimator 200, also referred to as a collimating lens, takes advantage of the phenomenon of TIR. TIR occurs when a ray of light reaches a boundary between a first medium having a refractive index of $n_1$ and a second medium having a refractive index of $n_2$ at an angle, $\theta$, larger than a critical angle, $\theta_{critical}=\arcsin(n_2/n_1)$, with respect to the normal of the boundary surface. At such angles, $\theta$, the light ray is totally reflected at the boundary such that no light will propagate beyond the boundary and hence substantially all light is reflected at the boundary. Hence a reflector is here not needed for collimating the light and producing a concentrated light beam.

The TIR collimator 200 has substantially the shape of a cone with a recess 202, extending about halfway through a body 204. The recess 202 is formed on a bottom side of the body 204 at a central region. The TIR collimator 200 comprises an integration zone 206 in which a light source or an image of a light source is arranged. The recess 202 has a side entry surface 208 and a central entry surface 210. A TIR surface 212 is provided at a side surface of the body 204 and an exit surface 214 provided at a top side of the body 204. The TIR surface 212 comprises a plurality of first lenslets 216. The exit surface 214 comprises a plurality of second lenslets 218.

The integration zone 206 is so positioned in relation to the body 204 that light from each point inside the integration zone 206 illuminates the entire target. It should be noted that if the integration zone 206 is larger than the light source providing the illumination (not shown), the light source can be moved within the integration zone 206 without affecting system performance, which will help relax the placing tolerances of the optical components. The recess 202 further allows for easy fitting of the TIR collimator 200 over a light source such as a light emitting diode (LED).

According to this embodiment the TIR surface 212 is an aspheric rotational surface. The exit surface 214 is in this case flat. Adding lenslets onto already designed surfaces of optical lenses may further improve the optical system performance, while preserving its original function. Another advantage being that no additional optical elements and therefore losses are being added. Hence the light output from the collimator may be made more efficient in terms of intensity and beam collimation and further less dependent on the characteristics of the light source. This is further advantageous as it facilitates uniform illumination having a round shape. Those skilled in the art realizes that other surfaces such as aspheric rotational or tilted surfaces can be used when desired as this increases the flexibility when designing the light output from the TIR collimator.

Figure 3:
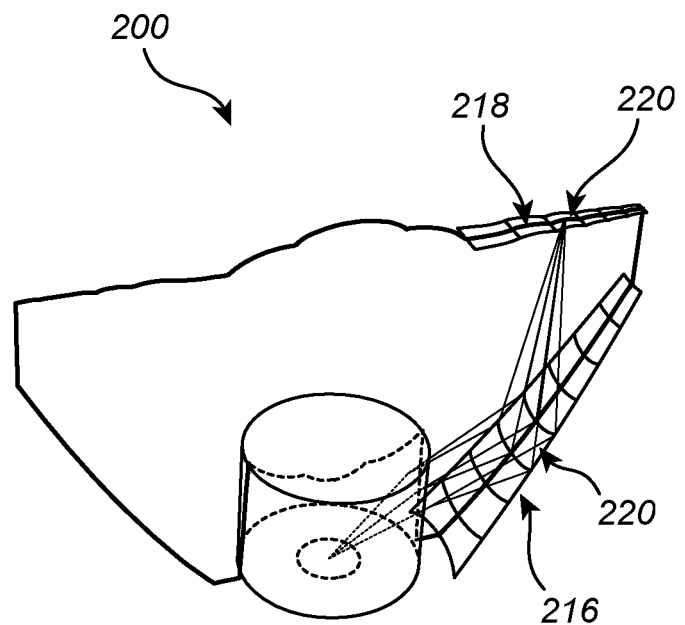
FIG. 3 is a schematic of an optical system according to an embodiment of the present invention.
Figure 3:
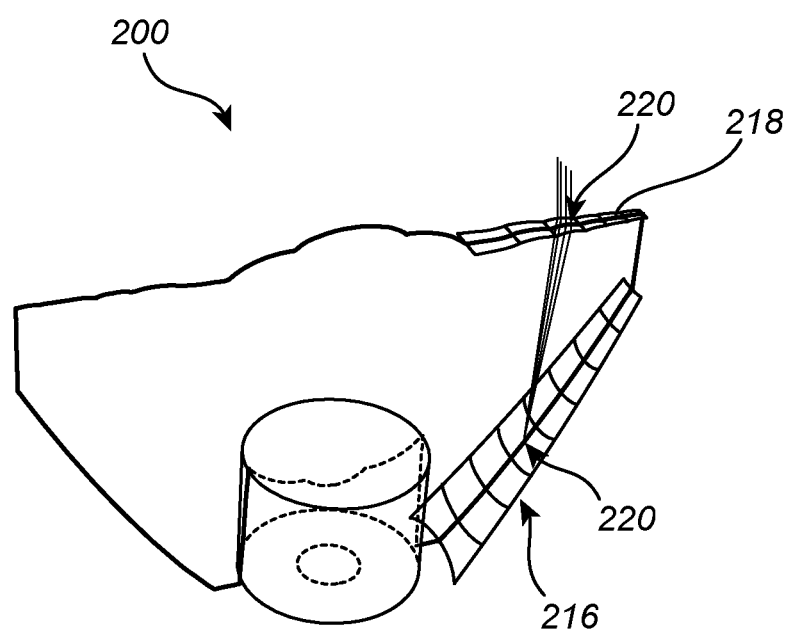

Next we, with reference to FIG. 2 and FIG. 3 discuss the arrays of lenslet 216, 218 that according to the subject matter of the present invention are provided on TIR surface 212 and the exit surface 214, respectively. Each of the first lenslets 216 is further arranged such that they form pairs 220 with each of the second lenslets 218.

By using a plurality lenslets 216, 218 small solid angles are utilized when collecting light from the integration zone 206 which leads to that a more uniform irradiance is obtained, compared to the using only a few optical elements as discussed above. By further forming pairs 220 of lenslets wherein the first lenslet 216 of the pair 220 focuses light from the integration zone 206 upon the second lenslet 218 of the pair 220, and the second lenslet 218 of the pair 220 focuses the target (not shown) upon the first lenslet 216 of the pair 220, uniform illumination on the target is provided by the TIR collimator 200. The light sources used for producing uniform illumination may therefore for instance consist of one or several light sources having different colours, or arrays of light sources having regions that produce less or no light emission, as long as the light is emitted within the integration zone.

The TIR collimator 200 further comprises a centre lens 222 comprising a centre lens entry surface 224 arranged at the central entry surface 210 of the recess 202 and a centre lens exit surface 226 arranged centrally on the exit surface 214 of the body 204. Light entering the central region of the body 204 can by this arrangement also be utilized for uniform illumination on a target.

In correspondence with the discussion above for the TIR surface 212 and the exit surface 214, the centre lens entry surface 224 and centre lens exit surface 226 further comprises, respectively, a plurality of third lenslets 228 and fourth lenslets 230. Each of the third lenslets 228 forms a pair with each of the fourth lenslets 230, wherein the third lenslet 228 of the pair focuses light from the integration zone 206 upon the fourth lenslet 230 of the pair, and wherein the fourth lenslet 230 of the pair focuses the target upon the third lenslet 228 of the pair, such that the TIR collimator 200 produces uniform illumination on the target. The advantages of the present embodiment are the same as the ones described in relation to the pair formation of lenslets of the TIR surface 212 and exit surface 214.

According to one embodiment of the present invention a lenslet may have a freeform shape that is a generalized Cartesian oval arranged to couple a wavefront originating from the centre of the integration zone 206 and refracted at the side entry surface 208, with a spherical wavefront originating from a centre of the corresponding second lenslet. The freeform shape provides additional degrees of freedom when designing optical elements as smaller system sizes may be achieved as compared to using conventional rotationally symmetric surfaces.

Figure 4:
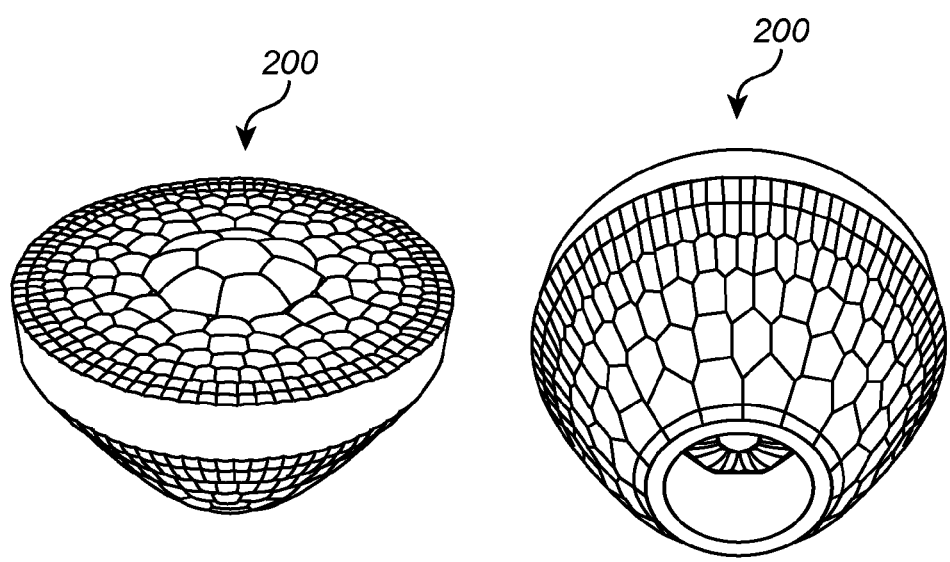
FIG. 4 is a schematic of an optical system according to an embodiment of the present invention.

The procedure to find the lenslet surfaces having the above given properties may be based on a numerical calculation of providing a surface that ensures constant path length to all rays contained in the two wavefronts to couple to each other. FIG. 4 illustrates one embodiment of the present invention in which a TIR collimator 200 has a plurality of superimposed lenslets. It should be noted that the size of the respective lenslets on the TIR collimator 200 are set by the resulting integration zone image size on the exit surface. The embodiment shown has lenslets included in the TIR surface and the exit surface as well in the two center lens surfaces. The sizes of the lenslets on the exit surfaces follow from the extent of the integration zone: When tracing rays from the edges of the integration zone over the center point of a lenslet on the TIR surface (of the center lens entry surface), a cone of rays marks on the exit surface the needed size of the lenslet on the exit surface to ensure all light is captured. The size of the lenslets on the TIR surface follows by the same methods, but instead of starting with rays from the integration zone, starting with rays from the outside of the TIR collimator. It is sufficient to construct one column of lenslet pairs as shown in FIG. 3 and then arranging them in a CAD program to form a solid body as shown in FIG. 4. The advantages of this embodiment is that although the shape is similar to standard TIR collimators, a very strong performance increase in terms of beam uniformity and colour mixing is achieved, without widening the beam strongly as with normal faceting as e.g. disclosed in U.S. 2013/0058103.

Figure 5:
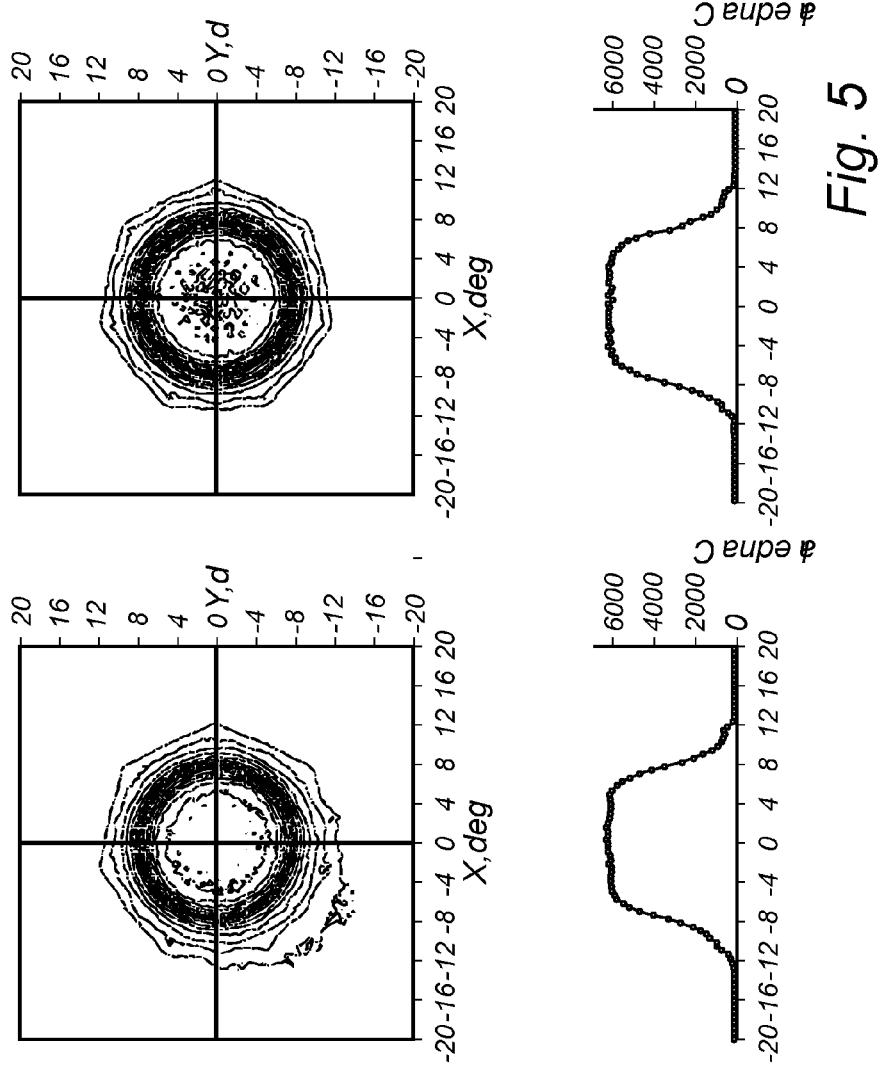
FIG. 5 shows computer simulations for the optical system according to FIG. 4.

Computer simulations reveal that using the design of the TIR collimator 200 disclosed in FIG. 4 a uniform illumination on a target is provides even if there is a strong spatial variation in the irradiance within the integration zone. FIG. 5 illustrates the result of ray-tracing simulations for two identical square light sources (Source A and Source B) placed respectively at two different locations 502, 504 within the integration zone 506. Source B is positioned in the centre 502 of the integration zone 506, whereas the Source A is positioned in the vicinity of the edge 504 of the integration zone 506. FIG. 5 further shows a result of the ray-tracing simulations for the two positions 502, 504. From the graphs it can be concluded that the luminous intensity in the far field is substantially the same for the two positions. These calculations show that good uniformity of the illumination on a target can be provided even if there are pronounced spatial intensity variations within the integration zone 506.

The person skilled in the art realizes that the present invention by no means is limited to the preferred embodiments described above. On the contrary, many modifications and variations are possible within the scope of the appended claims.

For example the TIR collimator may be of any transparent material such as a plastic, a glass or crystal materials such as sapphire.

According to an embodiment of the present invention each of the plurality of third lenslets 228 is a section of rotationally symmetric surface of aspheric cross section. An advantage of superimposing the lenslets on a non-flat surface is that the need of additional optical elements for light collimation is reduced.

According to another embodiment each of the second 218 and the fourth lenslets 230 has, when projecting light into infinity, rotational symmetry with an elliptical profile to focus a point to become a parallel beam. To a person skilled in the art, it is clear that instead of providing uniform intensity in the far field, the same procedure can be provided in the near field to provide uniform illuminance.

It is also possible, if a smoother light distribution is wanted, as integration tends to produce light distribution with sharp cut offs, to included some diffuse properties to the second 218 and fourth 230 lenslet surfaces. It is thereby possible to obtain an improved uniform illumination and control of the collimation of the light exiting the TIR collimator 200. It should further be noted that the TIR collimator provided according to the present invention are suitable for a broad range of light sources or arrays of light sources as effects pertaining to non-uniform of the light source or the light sources may be diminished according to the subject matter of the present invention. Hence the present TIR collimator is suitable forming a luminaire comprising light emitting diodes (LEDs) such as mid power, multi-channel, or spaced apart RGB arrays. Those skilled in the art understand that such light sources may be used in spot lamps, MR 16, GU10, AR111, retail lighting, PAR lamps or other light sources for which standard TIR collimators produces beam pattern having non-uniformities (in intensity, color or both), or where color and or position and color over angle mixing is important.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An optical system for producing uniform illumination on a target, comprising:
   a body;
   a recess formed on a bottom side of the body at a central region thereof accommodating a light source arranged in an integration zone, the recess having a side entry surface and a central entry surface;
   a total internal reflection surface provided at a side surface of the body, wherein the total internal reflection surface comprises a plurality of first lenslets, each of the first lenslets being radially adjacent to one or more others of the first lenslets and circumferentially adjacent to one or more others of the first lenslets; and
   an exit surface provided at a top side of the body, the exit surface comprising a plurality of second lenslets, each of the second lenslets being radially adjacent to one or more others of the second lenslets and circumferentially adjacent to one or more others of the second lenslets;
   wherein each of the first lenslets forms a pair with a respective one of the second lenslets, such that a distance separating each pair of lenslets is substantially equal to a focal length of both the first and second lenslet in that pair;
   wherein the light source provides light to the total internal reflection surface through the side entry surface;
   wherein the first lenslets of the pairs image the light source from the integration zone on the second lenslets of the pairs; and
   wherein the second lenslets of the pairs image the first lenslets of the pairs on the target,
   such that the optical system produces uniform illumination on the target.

2. The optical system according to claim 1, wherein the total internal reflection surface consists of an aspheric rotational surface.

3. The optical system according to claim 1, wherein the exit surface is chosen from a group of geometries consisting of flat, tilted and aspheric rotational surfaces.

4. The optical system according to claim 1, further comprising a center lens comprising:
   a center lens entry surface arranged at the central entry surface of the recess, wherein the center lens entry surface comprises a plurality of third lenslets;
   and a center lens exit surface arranged centrally on the exit surface of the optical system, wherein the center lens exit surface comprises a plurality of fourth lenslets;
   wherein each of the third lenslets forms a pair with a respective one of the fourth lenslets;
   wherein the third lenslet of the pair focuses light from the integration zone upon the fourth lenslet of the pair; and
   wherein the fourth lenslet of the pair focuses light upon the target from the third lenslet of the pair,
   such that the optical system produces uniform illumination on the target.

5. The optical system according to claim 4, wherein each of the plurality of third lenslets is an off-axis section of a surface of rotationally symmetric shape with an aspheric profile.

6. The optical system according to claim 4, wherein each of the second and the fourth lenslets has rotational symmetry with an elliptical profile to focus a point within an optical medium to become a parallel beam.

7. The optical system according to claim 1, wherein each first lenslet has a freeform shape that is a generalized Cartesian oval arranged to couple a wavefront originating from the center of the integration zone and refracted at the side entry surface through the corresponding second lenslet and to the target.

8. The optical system according to claim 7, wherein the freeform shape is approximated by one of a spherical surface, an ellipsoidal surface and a toroid surface described by two crossed spherical sections.

9. The optical system according to any claim 1, wherein the integration zone is arranged in the recess of the optical system.

10. The optical system according claim 1, wherein the integration zone is flat, disk shaped or a spheroid.

11. A luminaire comprising an optical system according to claim 1 and a light source.

12. The luminaire according to claim 11, wherein the light source is a solid state light source.

13. The luminaire according to claim 12, wherein the solid state light source is a single-chip or multi-chip package, with one or more colors of red, green, blue, white or any other color, or an array individually packed LEDs.

* * * * *